United States Patent
Spindler et al.

(10) Patent No.: US 10,029,860 B2
(45) Date of Patent: Jul. 24, 2018

(54) ROTARY HOPPER FEEDER FOR CONVEYING AND SEPARATING CONNECTION ELEMENTS THAT HAVE AT LEAST ONE SHAFT

(71) Applicant: EJOT GmbH & Co. KG, Bad Berleburg (DE)

(72) Inventors: Daniel Spindler, Tambach-Dietharz (DE); Marco Mielisch, Erfurt (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 98 days.

(21) Appl. No.: 14/917,295

(22) PCT Filed: Sep. 11, 2014

(86) PCT No.: PCT/EP2014/069427
§ 371 (c)(1),
(2) Date: Mar. 8, 2016

(87) PCT Pub. No.: WO2015/036500
PCT Pub. Date: Mar. 19, 2015

(65) Prior Publication Data
US 2016/0214801 A1    Jul. 28, 2016

(30) Foreign Application Priority Data
Sep. 11, 2013  (DE) ................ 10 2013 109 952

(51) Int. Cl.
B65G 35/08    (2006.01)
B65G 47/14    (2006.01)

(52) U.S. Cl.
CPC ................ *B65G 47/1457* (2013.01)

(58) Field of Classification Search
CPC .. B65G 47/1457; B65G 2201/02; B65B 35/08
(Continued)

(56) References Cited

U.S. PATENT DOCUMENTS 3,254,753 A    6/1966  Aidlin
3,295,659 A    1/1967  Aidlin
(Continued)

FOREIGN PATENT DOCUMENTS

CH        596 064 A5    2/1978
CH        596064 A5 *  2/1978  ......... B65G 47/1457
(Continued)

OTHER PUBLICATIONS

Written Opinion and International Search Report in corresponding PCT application PCT/EP2014/069427 dated Sep. 2, 2015, 9 pp. in German and 3 pp. in English.
(Continued)

*Primary Examiner* — Gene O Crawford
*Assistant Examiner* — Lester Ill Rushin
(74) *Attorney, Agent, or Firm* — Juan Carlos A. Marquez; Marquez IP Law Office, PLLC (57) ABSTRACT

The invention relates to a rotary hopper feeder (10) for conveying and separating elements (20) which have at least one shaft, comprising a rotary feeder (18) with radially oriented conveyor cells (22) for conveying the elements (20), said rotary feeder (18) being at least partially surrounded by a hopper wall (14). The invention is characterized in that said conveyor cells (22) have holes (23) at the cell edges (18) and below the rotary feeders (18), near the holes (23), a rolling surface (28) is provided on which at least parts of the shafts of the elements (20) with shafts are supported and made to roll as they are conveyed.

12 Claims, 6 Drawing Sheets

(58) Field of Classification Search
USPC .......................................... 198/391, 392, 757
See application file for complete search history.

(56) References Cited

U.S. PATENT DOCUMENTS

| | | | |
|---|---|---|---|
| 3,684,129 A | | 8/1972 | Loy et al. |
| 3,785,623 A | * | 1/1974 | Konig ..................... A21C 5/04 |
| | | | 366/142 |
| 4,312,438 A | | 1/1982 | Vatsvog |
| 4,828,100 A | * | 5/1989 | Hoppmann ........ B65G 47/1428 |
| | | | 198/392 |
| 5,473,703 A | * | 12/1995 | Smith ................... G06M 1/101 |
| | | | 221/200 |
| 2013/0152771 A1 | | 6/2013 | Coma Asensio |

FOREIGN PATENT DOCUMENTS

| | | |
|---|---|---|
| DE | 34 22 838 A1 | 1/1985 |
| EP | 2 295 350 A1 | 3/2011 |
| FR | 1 126 899 A | 12/1956 |
| FR | 2 264 718 A2 | 10/1975 |
| GB | 904 634 A | 8/1962 |
| GB | 1 423 318 A | 2/1976 |

OTHER PUBLICATIONS

German Search Report in corresponding German application 10 2013 109 952.1 dated Aug. 11, 2014, 7 pp. in German.

\* cited by examiner

ROTARY HOPPER FEEDER FOR CONVEYING AND SEPARATING CONNECTION ELEMENTS THAT HAVE AT LEAST ONE SHAFT

The invention relates to a rotary hopper feeder of the type specified in the preamble of claim 1.

Generic rotary hopper feeders are known from patent documents U.S. Pat. No. 4,312,438, U.S. Pat. No. 3,254,753 or EP 2 295 350 A1, for example. They include a rotary feeder which is surrounded by a hopper wall. As the rotary feeder revolves about its center in a rotary direction of conveyance, elements that have a shaft will be received and conveyed in its conveyor cells. These elements are part of a lot that was previously introduced as bulk material into the rotary hopper feeder. To ensure proper positional alignment, so-called baffles are usually provided for ejecting any misaligned elements from the conveyor cells. In the conveyor cells, the individual elements are conveyed against gravity and are individually removed from the rotary hopper feeder at an output position thereof.

It is the object of the invention to further develop a rotary hopper feeder of the type specified in the preamble of claim 1 with a view to improving its efficiency.

This object is accomplished by the characterizing features of claim 1 in combination with the features listed in its preamble.

Advantageous embodiments of the invention are defined in the subclaims.

A prior art rotary hopper feeder for conveying and separating elements which have at least one shaft, more particularly elements which have a shaft and a head, comprises a rotary feeder which includes radially oriented conveyor cells for conveying said elements. The rotary feeder is at least partially surrounded by a hopper wall.

In accordance with the invention, the conveyor cells have holes at the cell edges, and below the rotary feeder, near the holes, a rolling surface is provided on which at least part of the shafts of said elements with shafts are supported and made to roll as they are conveyed. More specifically, the rotary feeder is mounted so as to be inclined to the horizontal. A shaft as defined in the present invention is an essentially rotationally symmetrical element whose height is greater than its cross-sectional diameter.

Any impurities introduced into the rotary hopper feeder as well as any abraded material will be discharged via the holes provided in the rotary feeder, in which the shaft elements are made to roll for entrainment. As a result, dirt will not be able to deposit in the conveyor cells and have a long-term detrimental effect on the yield. The apparatus will thus require a minimum of maintenance and still ensure high yields.

According to an advantageous embodiment of the invention, a conveyor cell has a discharge slope which extends radially from the hole toward the inside. Relative to the rotary feeder surface, this discharge slope has its lowest level at the hole. This will facilitate the ejection at a discharge baffle of elements to be conveyed which have a head and whose shaft length is shorter than the height of the rotary feeder at the hole. This reliably allows the ejection of any misaligned elements, thus emptying conveyor cells for the reception of new elements. This will in turn increase the yield of the system. In particular those elements hanging or sticking in the hole vertically, for example, will be ejected solely by gravity via the discharge slope once the conveyor cell has reached a position in which the resulting downforce is directed approximately along the hole in the conveyor cell.

In yet another advantageous embodiment of the invention, the rolling surface, at least its circumference, is designed to be circular in shape, and to have an outer diameter which corresponds to the diameter of the rotary feeder. Providing equal diameters for the rolling surface and the rotary feeder will ensure that elements which not only have a shaft but also a head integrally formed on the shaft will be guided such that the shaft will roll on the rolling surface and the head will come to hang outside the diameter of the rotary feeder. This is a simple way of aligning the elements in a desired position.

Moreover, it proves to be advantageous to be able to provide a peripheral wall at least at the axial height of the rotary feeder. Such a wall will prevent elements from falling out of conveyor cells ahead of time. Spacing the peripheral wall from the rotary feeder will create a guide for elements with a head. Such a gap can be used to realign the head into the proper position along the outer edge, which will thus allow the positional alignment of the elements to be controlled by adapting the guide gap to the head size of these elements. Preferably, the peripheral wall may be formed as an integral unit with the hopper wall. This results in a particularly simple design of a rotary hopper feeder. However, the peripheral wall may also be formed by an insert which is placed between the hopper wall and the rotary feeder. This makes the rotary hopper feeder more flexible regarding its adaptation to different head sizes.

Elements having a shaft and a head may be screws, friction welding elements, or nails, for example.

The spacing of the peripheral wall has been chosen so as to prevent the head of an element from getting caught on the peripheral wall, in particular the hopper wall, during rotation of the rotary feeder.

More specifically, the spacing between the rotary feeder and the peripheral wall has been chosen to be smaller than the shaft diameter but to correspond to between 1.2 to 1.8 times the head size of an element with a head.

In yet another advantageous embodiment of the invention, a discharge baffle may be provided on a rolling surface for ejecting any misaligned elements from the conveyor cell. Owing to the holes, the discharge baffle may be mounted on the rolling surface and act on the elements through the holes. This will facilitate the ejection of elements since the discharge baffle will only act on the one element currently located in the hole. This completely avoids the problem of elements getting jammed on the discharge baffles—which may arise with discharge baffles provided on the side of the rotary feeder facing the elements. As a result, maintenance needs are reduced and yields are improved.

The presence of a baffle makes this kind of ejection means particularly efficient in its effective direction, since—apart from the orthogonal movement relative to the rotary feeder—no additional paths or movements of the element are required for its ejection.

In a particularly advantageous embodiment of the invention, the discharge baffle may be designed as a stationary wedge on the rolling surface. The rotary motion of the feeder will cause any misaligned element to be lifted far enough out of the hole of the rotary feeder so that the downforce will eventually cause it to fall out of the conveyor cell. Furthermore, the bottom side of the rotary feeder may feature a peripheral groove of the same width and height as the discharge baffle. In this way, the rotary feeder may be guided past the discharge baffle without getting jammed there, at the same time allowing the discharge baffle to still act on the elements guided in the hole of the conveyor cell.

The ratio of the height of the discharge baffle to the height of the rolling surface may be smaller than half of the sum of the shaft diameter of the elements and the thickness of the rotary feeder. Owing to this choice of dimensions, properly aligned elements will not be ejected.

According to the invention, plural discharge baffles can also be arranged the one behind the other. As a result, any misaligned element will always be ejected at the first discharge baffle, as viewed in the direction of rotation, with no element acting on the subsequent baffles anymore. Consequently, the first discharge baffle, as viewed in the direction of rotation, will always be worn out first, and the baffles will only have to be replaced after the last baffle has worn out. This will result in considerably longer maintenance intervals.

Preferably, the rolling surface may have a discharge gap that is dimensioned such that elements which are properly aligned will fall through the discharge gap as soon as the rotary feeder pushes them across the discharge gap. More particularly, the discharge gap extends in a radial direction, meaning that only those elements can be discharged whose shaft lengths are arranged in this direction. To be more specific, the width of the gap roughly corresponds to the width of the holes, with 10% tolerance. This results in a sorting function according to positional alignment, in addition to the discharge baffle. This arrangement does not require any actuating elements for discharging elements as these can be separated during their movement and then discharged in proper alignment solely by way of gravity.

In yet another embodiment, a discharge rail may be connected to the gap so as to guide the elements to further processing once they have dropped through the gap. A suitable discharge rail may provide a buffer for further processing whose capacity can be adjusted via the length of the discharge rail. More specifically, the discharge rail is mounted essentially at right angles to the rotary feeder. In this way, elements can be discharged optimally without any jamming. In yet another embodiment, the discharge rail may be adapted to the geometry of an element.

Preferably, the discharge gap may have rounded edges. It is considered particularly advantageous if the radius—from the rolling surface to the discharge rail relative to the rotary direction of conveyance of the rotary feeder—is smaller than the opposite radius, from the discharge rail to the rolling surface relative to the rotary direction of conveyance. This will prevent jamming of the elements in case the discharge rail is full since the elements can then be conveyed further along the rounded edge, from the discharge rail to the rolling surface, without jamming and will be conveyed further on the rolling surface after the discharge gap.

This effect can be improved by mounting the rolling surface at a lower level in the rotary direction of conveyance after the discharge gap than the rolling surface before the discharge gap. In the event of a full discharge gap, the rotary feeder will thus be able to entrain an element again with little tolerance, without any jamming.

Preferably the rotary feeder may be made of plastic. This will make for gentler handling of the elements and lower production costs. Should an element get caught in a discharge gap, this problem may then be compensated by the elasticity of a plastic rotary feeder, as the plastic rotary feeder will yield and pass over the element in such a situation, without blocking.

According to another embodiment of the invention, the rotary feeder may be connected to a drive via a free wheel, against the rotary direction of conveyance. This will facilitate the elimination of problems in case of operating trouble, since jammed elements can thus be loosened easily.

Additional advantages, features and possible applications of the present invention may be gathered from the description which follows in which reference is made to the embodiments illustrated in the drawings.

Throughout the description, the claims and the drawings, those terms and associated reference signs are used as are listed in the List of Reference Signs which follows below. In the drawings:

Figure 1:
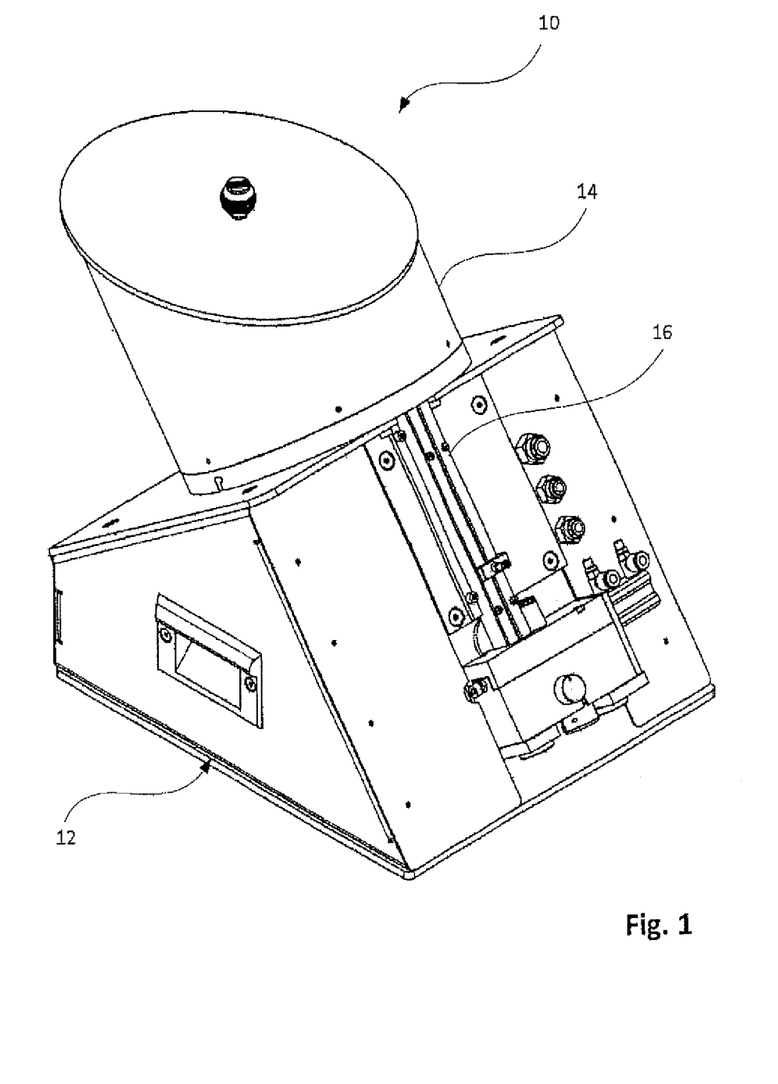
FIG. 1 is a view of a rotary feeder according to the invention for conveying and separating elements having a shaft which are introduced into the feeder in the form of bulk material.

FIG. 1 shows the rotary hopper feeder 10 with its housing 12 which accommodates the drive, a hopper wall 14 surrounding a rotary feeder 18, and a discharge rail 16 connected to a hopper bottom. Elements received within the hopper wall 14 will be conveyed to the top of the inclined rotary feeder 18 during rotation of the latter, from where they will then drop into the discharge rail 16 under the action of gravity where they can be buffered depending on the length of the discharge rail 16.

Figure 2:
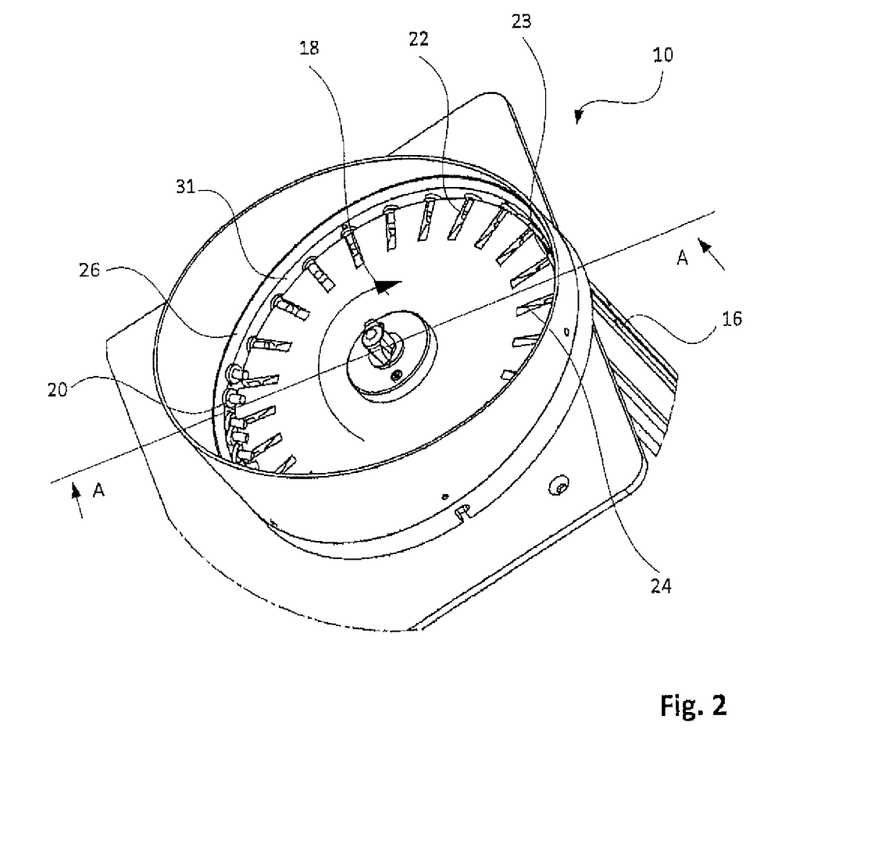
FIG. 2 is a top view of a rotary hopper feeder according to the invention.

FIG. 2 is a top view of a rotary hopper feeder 10 according to the invention which has a rotary feeder 18. As said rotary feeder 18 rotates in the indicated direction, elements with a shaft and a head 20 will be properly aligned and conveyed therein, and ultimately be discharged individually at the discharge rail 16 shown. The rotary feeder 18 has conveyor cells 22 in which the elements 20 are conveyed. Said conveyor cells 22 have holes 23 provided at the cell edges, whose function will be explained in more detail with reference to FIG. 3. Moreover, said conveyor cells are provided with a discharge slope 24, whose function will be described in more detail with reference to FIG. 4. As can clearly be seen in the view of FIG. 2, a gap 31 is disposed between the rotary feeder 18 and a peripheral wall 26, which gap will receive the head of the element 20, thus allowing elements to be conveyed in a certain positional alignment. Similarly, the elements can be separated in a certain positional alignment, which will be described in more detail with reference to FIG. 3. The width of the gap 31 is adapted to the size of the head.

Figure 3:
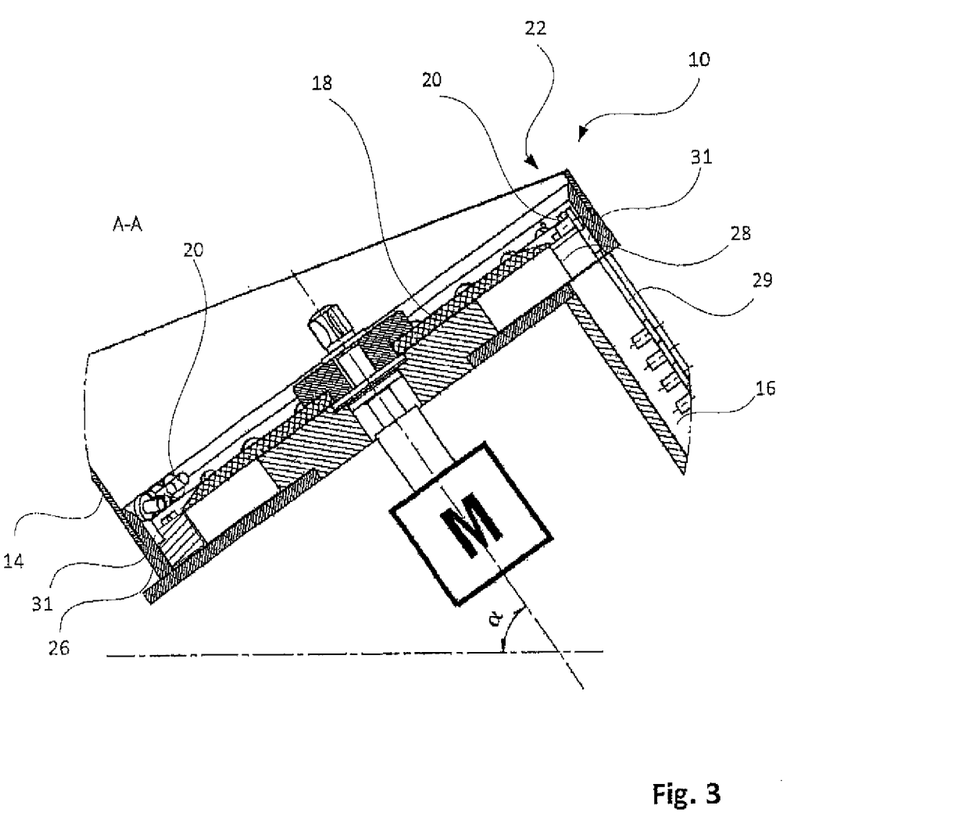
FIG. 3 is a sectional view of the rotary hopper feeder taken along the plane of lines A-A.

FIG. 3 is a sectional view of the rotary hopper feeder 10, taken along the plane of lines A-A. During rotation of the feeder, the elements 20 contained therein will drop into the conveyor cells 22. The elements 20 are supported on a rolling surface 28 underneath the rotary feeder 18. During rotation of the rotary feeder 18, properly aligned elements will be guided such that their shaft will roll across the rolling surface 28. This makes for particularly gentle transport. As shown in FIG. 3, the rolling surface 28 has a discharge gap 29 in the discharge area, with elements 20 being discharged shaft first through the gap, under the action of gravity, and subsequently carried to further processing in a discharge rail 16. According to this embodiment, the rolling surface 28 is designed in the form of a ring which is interrupted by the discharge gap 29 in the discharge area. The outer portion of the ring which extends beyond the diameter of the rotary feeder features a groove which is adapted to the head diameter of the elements to be conveyed in such a way that the elements are conveyed with their heads supported or freely hanging therein. On the whole, the heads are guided opposite the peripheral wall 26 which also serves as a mount for the hopper wall 14. Schematically shown in this illustration is the motor to which the rotary feeder is connected via a free wheel which enables the rotary feeder 18 to be released against the rotary direction of conveyance.

Figure 4:
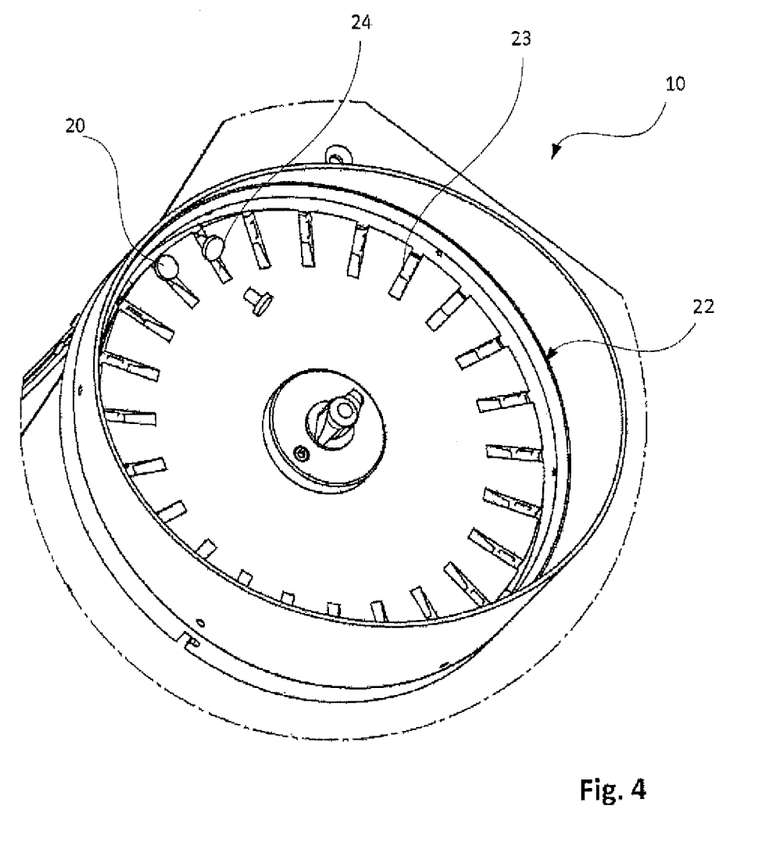
FIG. 4 is a top view of the rotary hopper feeder.

FIG. 4 is a top view of the rotary hopper feeder 10 which shows that the element 20 can be discharged more easily from the hole 23 via the discharge slope 24 under the action of an appropriate downforce.

Figure 5:
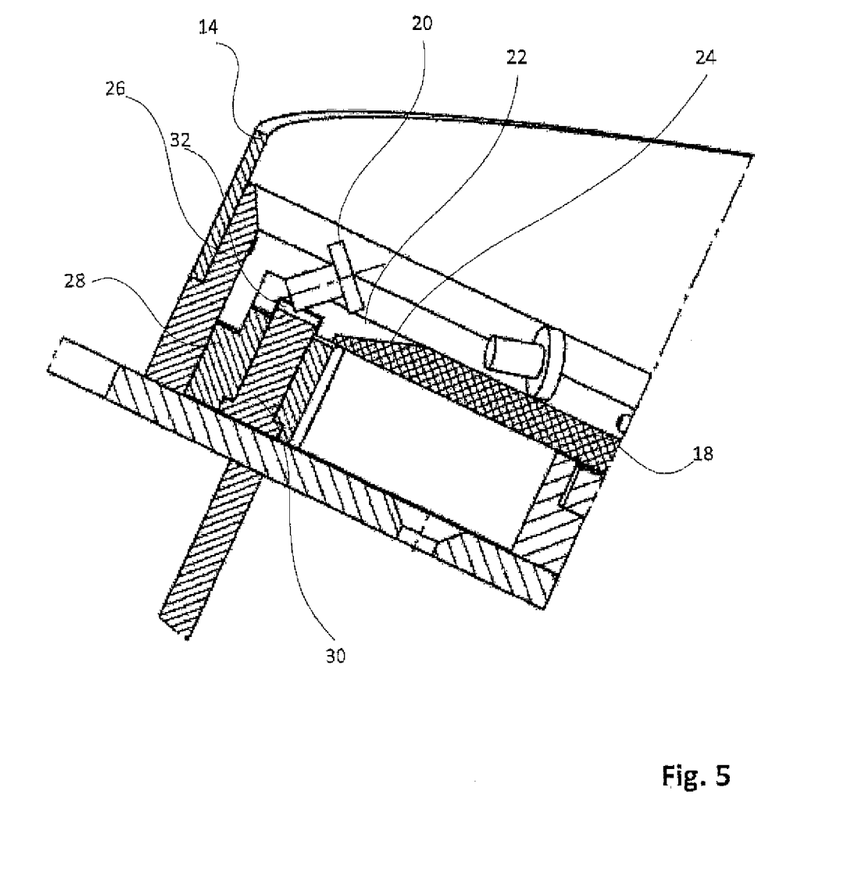
FIG. 5 is a view of a discharge baffle integrally formed with the rolling surface.

This is especially true for elements 20 whose shaft length is shorter than the thickness of the rotary feeder. For the ejection of misaligned elements 20, the invention provides for a discharge baffle 30 to be integrally formed in the rolling surface 28, as shown in FIG. 5. Clearly seen in this view is the section through the conveyor cell 22 which allows the elements 20 to make contact with the rolling surface 28 via the hole 23. Moreover, it shows the radially extending discharge slope 24 as well as a groove 32 provided in the bottom of the rotary feeder which groove corresponds in height and width to the discharge baffle 30, The groove 32 is suitably designed such that it will allow the rotary feeder 18 to move past the discharge baffle 30 without any problems as it conveys elements, yet at the same time allowing the reliable removal of any misaligned elements 20 from the conveyor cells 22. Mounting the discharge baffle 30 below the rotary feeder 18 will reliably prevent the elements 20, which are introduced in the form of bulk material, from getting jammed on a discharge baffle 30. Moreover, when the elements 20 are being ejected, only one element 20 at a time will be explicitly acted on for discharging it.

Figure 6:
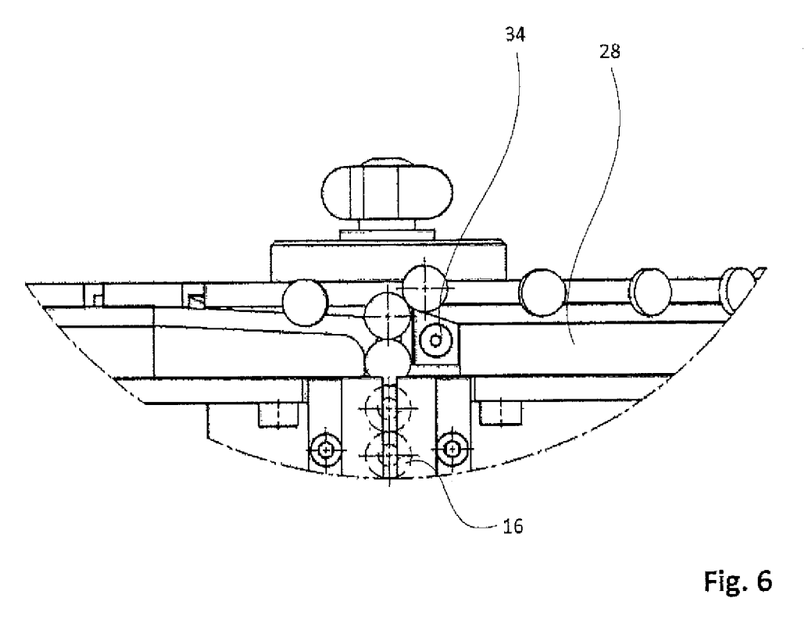
FIG. 6 is a lateral view of the rotary feeder in the area of the discharge site, with the hopper wall cut away.

The view of FIG. 6 is a lateral view of the rotary feeder in the area of the discharge site, with the hopper wall cut away. Any correctly aligned elements 20 conveyed in the holes 23 of the rotary feeder 18 on the rolling surface 28 are usually conveyed up to the discharge gap 29 which is provided in the circular rolling surface 28 from where they then drop into the discharge rail 16. Should the discharge rail 16 be full, a baffle 34 is provided in front of the discharge gap 29 as viewed in the conveyance direction, which baffle 34 will lift elements 20 past accumulated elements 20, This effectively avoids jamming. On the other hand, this effect may even be improved by making the level of the rolling surface 28 lower behind the discharge gap 29 than in front of the discharge gap 29, as viewed in the rotary direction of conveyance. Moreover, the rolling surface 28 is rounded from its upper edge to the discharge gap 29 so as to avoid jam-free re-entrainment of accumulated elements 20. This considerably increases the maintenance intervals of the rotary hopper feeder 10 according to the invention. Owing to the holes 23 provided in the rotary feeder 18 and the fact that the elements 20 are made to roll as they are conveyed, the device also achieves a high rate of properly aligned elements 20.

The invention claimed is:

1. Rotary hopper feeder for conveying and separating elements having at least one shaft, comprising a rotary feeder with radially oriented conveyor cells for conveying the elements, said rotary feeder being at least partially surrounded by a hopper wall characterized in that the conveyor cells have holes at the cell edges and below the rotary feeder, near the holes, a rolling surface is provided on which at least parts of the shafts of the elements with shafts are supported and made to roll as they are conveyed, wherein at least an outer circumference of the rolling surface is a circular design and an outer diameter thereof corresponds at least partially to the diameter of the rotary feeder, and wherein the rolling surface is rounded at the discharge gap, with the radius from the rolling surface in the direction of the gap to the discharge rail, as viewed in the direction of rotation of the rotary feeder, is smaller than the radius which is opposite as viewed in the direction of rotation, from the discharge gap to the rolling surface.

2. Rotary hopper feeder as claimed in claim 1 characterized in that the conveyor cell is provided with a discharge slope which extends from the hole radially toward the inside.

3. Rotary hopper feeder as claimed in claim 1 characterized in that a peripheral wall is provided at least at the axial height of the rotary feeder.

4. Rotary hopper feeder as claimed in claim 3 characterized in that the diameter of the peripheral wall is dimensioned such that a head gap is formed between the peripheral wall and the rotary feeder in which the head of an element can be guided.

5. Rotary hopper feeder as claimed in claim 3 characterized in that the peripheral wall forms an integral unit with the hopper wall.

6. Rotary hopper feeder as claimed in claim 1 characterized in that a raised discharge baffle is provided on the rolling surface, said baffle acting to discharge misaligned elements from the conveyor cell.

7. Rotary hopper feeder as claimed in claim 3 characterized in that the discharge baffle is designed in the form of a wedge on the rolling surface, and that the bottom of the rotary feeder has a continuous groove which is at least as wide and as high as the discharge baffle.

8. Rotary feeder as claimed in claim 1 characterized in that the height of the discharge baffle relative to the rolling surface is designed in such a way that properly aligned elements will not be ejected and any misaligned elements will be ejected.

9. Rotary feeder as claimed in claim 1 characterized in that the rolling surface has a discharge gap for discharging the elements.

10. Rotary feeder as claimed in claim 1 characterized in that connected to the discharge gap is a discharge rail which receives elements discharged through the gap.

11. Rotary hopper feeder as claimed in claim 1 characterized in that the rotary feeder is made of plastic.

12. Rotary hopper feeder as claimed in claim 1 characterized in that the rotary feeder is provided with a drive of the rotary hopper feeder via a free wheel, against the rotary direction of conveyance.

* * * * *